3,185,705
2-PHENYL-5,5-DI-ESTERS AND DI-AMIDES OF 2-PYRROLINE AND THE CORRESPONDING PYRROLIDINES
Frederick Leonard, Yonkers, and Norbert Gruenfeld, Bronx, N.Y., assignors to Geigy Chemical Corporation, New York, N.Y., a corporation of Delaware
No Drawing. Filed Apr. 24, 1963, Ser. No. 275,245
7 Claims. (Cl. 260—326.3)

This invention relates to certain novel derivatives of pyrroline and pyrrolidine, which possess valuable pharmacological properties and are useful as pharmaceutical agents. This invention also pertains to processes for their manufacture.

More particularly, this invention pertains to dicarbalkoxy and dicarboxamido derivatives of phenyl-substituted pyrrolines and pyrrolidines which may, respectively, be represented by the following general formulae:

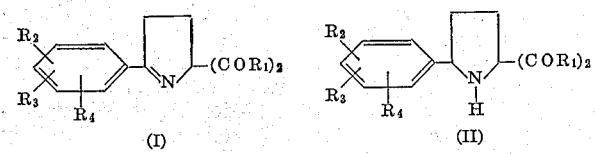

In these formulae $R_1$ represents lower alkoxy, amino and lower alkylamino. $R_2$, $R_3$ and $R_4$ denote hydrogen, halogen—preferably, chlorine and bromine—lower alkyl and lower alkoxy.

The term "lower alkyl" as used herein per se and as included in the term "lower alkoxy" means saturated monovalent straight-chain aliphatic radicals of the general formula —$C_mH_{2m+1}$ wherein $m$ designates an integer of less than five.

The compounds of this invention may be synthesized as follows:

Phenyl-substituted pyrroline-5,5-dicarboxylic acid esters under Formula I are prepared by treating di(lower)alkyl benzyloxycarbamido - 3 - oxopropyl malonates (made in accordance with prior art methods exemplified below) with hydrohalic acid, such as hydrochloric or hydrobromic acid, in an anhydrous medium consisting e.g. preferably of acetic acid, but dioxane, lower alkanol, etc. can likewise be used. While the reaction proceeds at room temperature (about 25° C.) when hydrobromic acid is used, the reaction proceeds best at elevated temperatures, e.g. 75° C., when hydrochloric acid is employed. In consequence of this procedure the hydrohalides of the desired compounds are obtained which can then be converted to the corresponding free bases in accordance with conventional methods. The diester derivatives thus obtained can be transformed to the corresponding amides according to prior art methods involving aminolysis.

These modes of preparation can be illustrated by the following diagrammatic presentation:

(1)

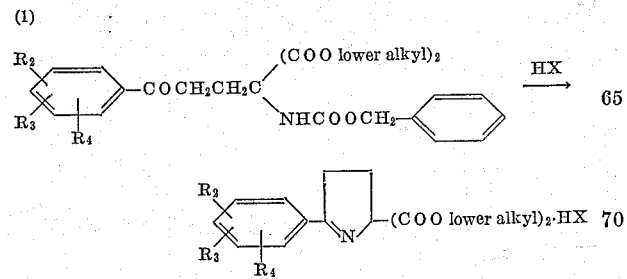

(2)

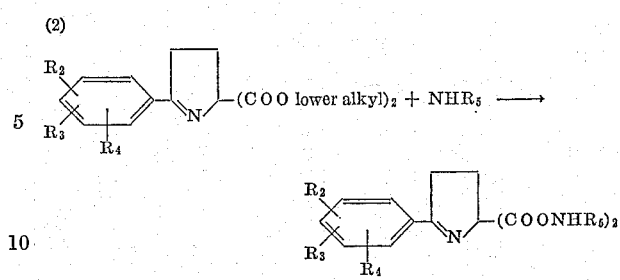

wherein $R_2$, $R_3$ and $R_4$ have the significance ascribed to them hereinabove, X stands for halogen, particularly chlorine and bromine and $R_5$ represents H or lower alkyl.

Compounds of Formula II, i.e. the corresponding pyrrolidine derivatives, can be obtained from compounds of Formula I by hydrogenation, as for example, in a Parr hydrogenator using platinum oxide or such other equivalent metal catalysts as palladium, rhodium, nickel, etc., at room temperatures or slightly elevated temperatures and at atmospheric or slightly above-atmospheric pressures.

This synthesis can be illustrated by the following equation:

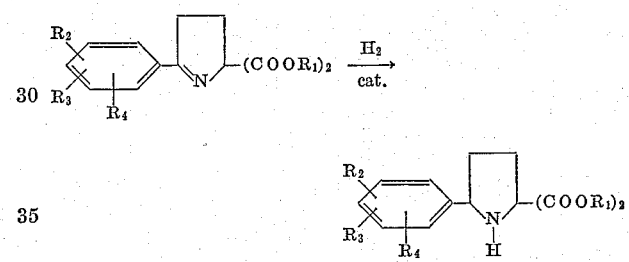

wherein $R_1$, $R_2$, $R_3$ and $R_4$ have the above-described meanings.

Alternatively, compounds of Formula II can also be synthesized directly from the above di(lower)alkyl benzyloxycarbamide-3-oxopropyl malonates, the starting material for preparing compounds of Formula I, by hydrogenation with palladium catalyst.

The present invention comprehends not only the above-described derivatives of pyrroline and pyrrolidine in their free base form, but it also includes pharmaceutically acceptable nontoxic acid addition salts which may be formed from said compounds in accordance with conventional practice, by using appropriate inorganic and organic acids, such as hydrohalic acids, especially hydrochloric and hydrobromic acids, sulfuric, ethanesulfonic and phosphoric acids as well as acetic, aminoacetic, lactic, succinic, malic, aconitic, phthalic and tartaric acids.

As mentioned above, the subject compounds possess valuable pharmacological properties; they possess properties affecting the central nervous system, exhibit hypotensive activity( e.g. on i.v. administration in the cat) and, in particular, possess diuretic properties.

More specifically, the compound of Example 2, (2-phenylpyrroline-5,5-dicarboxamide), for instance, which is non-toxic (there were no mortalities at 2 g./kg. p.o. in mice) gave the following results when tested for diuretic activity:

(a) In chloralose anesthesized cat at a dose of 5 mg./kg. i.v. the urine output was increased by 150%; urine excretion is 3 cc./hour as compared to 1.2 cc./hour for control animal.

(b) In rats at a dose of 100 mg./kg. p.o. the percent of total fluid administered that was excreted in 3 hours was 74% as compared to 60% for control group.

These new compounds and the methods for their preparation may be exemplified more fully by the following illustrative examples. The temperatures therein are given in degrees centigrade.

EXAMPLE 1

*Diethyl 2-phenylpyrroline-5,5-dicarboxylate*

(a) Diethyl aminomalonate was prepared from diethyl malonate as described in Organic Syntheses 40, 21, 24 (1960); yield ca. 80%, B.P. 70–73°/0.2 mm.

(b) Diethyl carbobenzyloxyaminomalonate was prepared by the general procedure described by H. M. Kissman, et al., J. Am. Chem. Soc., 75, 1967 (1953); this method was found superior to the one reported by M. Frankel et al., J. Am. Chem. Soc., 74, 3873 (1952). To a stirred refluxing solution of diethyl aminomalonate (131 g., 0.75 mole) in anhydrous benzene (1000 ml.) containing anhydrous potassium carbonate (1 mole, 138 g.) was added dropwise over a perior of three hours, benzyl chloroformate (K and K Labs., 119 g., 0.70 mole). Refluxing was continued for ½ hour after completed addition. The reaction mixture was filtered while hot and the inorganic precipitate was thoroughly washed with boiling benzene (3 x 100 ml.). The benzene was distilled off under reduced pressure and the residual oil was further dried at 125°/0.2 mm. to yield product (175 g., $n_D^{24°}$ 1.496) which solidified on standing. The crude product was identical to the product obtained after distillation (B.P. 155°/0.15 mm., $n_D^{26°}$ 1.495) and was used in the following Michael condensation without further purification.

(c) Diethyl (3 - phenyl - 3 - oxopropyl)benzyloxycarbamidomalonate: 3-dimethylaminopropiophenone hydrochloride (40.0 g., 0.2 mole) was suspended in absolute ethanol (175 ml., dried by distillation over sodium and diethyl succinate), and dimethylsulfate (33.0 g., 0.24 mole) was added dropwise at room temperature. The reaction was allowed to proceed at room temperature for two hours with continuous stirring. Subsequent addition of diethyl benzyloxycarbamidomalonate (49.2 g., 0.16 mole) suspended in sodium ethoxide solution (prepared by dissolving 0.325 mole of sodium in 250 ml. of absolute ethanol) resulted in a slightly exothermic reaction. The mixture was stirred at room temperature for one hour, then heated under reflux for 3 hours, and again stirred at room temperature overnight. The reaction mixture was added to ice (1000 g.). A viscous mass formed first and then crystallized on standing; yield 69 g., M.P. 58–60°. Recrystallization from isopropanol yielded the reaction product (54 g., M.P. 68–69°).

(d) Diethyl 2-phenylpyrroline - 5,5 - dicarboxylate hydrobromide: The above compounds (c) (44 g., 0.1 mole) was dissolved in glacial acetic acid saturated with HBr (100 ml.). Reaction (as evidenced by effverescence) was allowed to proceed at room temperature for one hour. The solution was then evaporated to dryness under reduced pressure and the residue was crystallized from anhydrous ether (400 ml.) to yield a crystalline product (34.1 g., M.P. 150–152° dec.). Recrystallization from ethanolether (1:5, 400 ml.) yielded the desired compound (30.2 g., M.P. 155–157° dec.).

(e) Diethyl 2-phenylpyrroline-5,5-dicarboxylate: The above compound (d) (11.1 g., 0.03 mole) was dissolved in water (100 ml.). The solution was rendered basic (pH 8–9) with saturated sodium carbonate solution and extracted with chloroform (4 x 100 ml.). The chloroform extract was washed with water, dried sodium sulfate and evaporated to dryness. The residue was crystallized from isopropyl ether to yield a crystalline product (8.0 g., M.P. 77–79°). Two recrystallizations from isopropyl ether gave the desired compound; M.P. 78–80°. Ultraviolet absorption:

$$\lambda_{max.}^{MeOH} \; 247 \; m\mu \; (\epsilon, \; 18,000)$$

EXAMPLE 2

*2-phenylpyrroline-5,5-dicarboxamide*

Diethyl 2-phenylpyrroline-5,5-dicarboxylate (7.25 g., 0.025 mole) was dissolved in ethanol (100 ml.). The solution was saturated with anhydrous ammonia in a pressure bottle at 0°. The solution was stored at room temperature for eleven days. The crystalline product (5.5 g., M.P. 243–245° dec.) was removed by filtration and was twice recrystallized from methanol (ca. 400 ml.) to yield the desired compound (3.9 g., M.P. 243–245° dec.). Ultraviolet spectrum:

$$\lambda_{max.}^{MeOH} \; 245 \; m\mu (\epsilon, \; 14,500)$$

EXAMPLE 3

*Diethyl 5-phenylpyrrolidine 2,2-dicarboxylate*

Diethyl 2 - phenylpyrroline - 5,5 - dicarboxylate (0.05 mole, 14.5 g.) was dissolved in ethanol. Platinum oxide (0.2 g.) was added and the mixture was hydrogenated at room temperature and 3 atm. of pressure for 4 hours. The catalyst was removed by filtration, fresh platinum oxide (0.2 g.) was added and the hydrogenation was continued under the same conditions for 7 additional hours. The catalyst was again removed by filtration and the solution was evaporated to dryness. The resulting mixture can be fractionated by preparative vapor phase chromatography to give the desired compound.

This application is a continuation-in-part of application Serial No. 244,903, filed December 17, 1962, solely by Frederick Leonard.

What is claimed is:

1. A compound of the class consisting of a substituted heterocyclic base and its non-toxic, pharmaceutically acceptable acid addition salts, said base being selected from the group consisting of derivatives of pyrroline and pyrrolidine of the formulae:

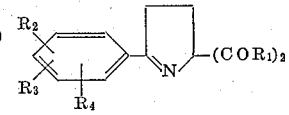 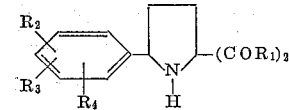

wherein
$R_1$ is a member selected from the group consisting of lower alkoxy, amino and lower alkylamino;
$R_2$, $R_3$ and $R_4$ are chosen from the group consisting of hydrogen, chlorine, bromine, lower alkyl and lower alkoxy.

2. Diethyl-2-phenylpyrroline-5,5-dicarboxylate.
3. 2-phenylpyrroline-5,5-dicarboxamide.
4. Diethyl 5-phenylpyrrolidine-2,2-dicarboxylate.
5. A process for preparing a compound of the formula

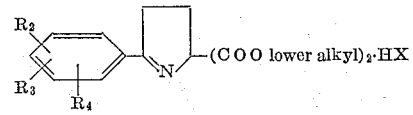

wherein
$R_2$, $R_3$ and $R_4$ are selected from the group consisting of hydrogen, chlorine, bromine, lower alkyl and lower alkoxy and X is halogen,
which comprises treating with hydrohalic acid in an anhydrous medium a compound of the formula

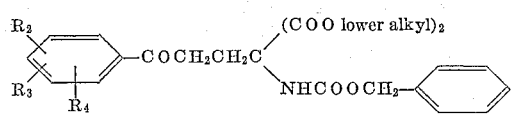

wherein $R_2$, $R_3$ and $R_4$ have the same meanings indicated above.

6. A process according to claim 5 wherein said anhydrous medium is selected from the group consisting of glacial acetic acid, dioxane and lower alkanol.

7. A process for preparing a compound of the formula

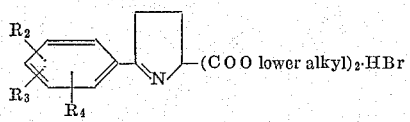

wherein
R$_2$, R$_3$ and R$_4$ are selected from the group consisting of hydrogen, chlorine, bromine, lower alkyl and lower alkoxy, which comprises treating a compound of the formula

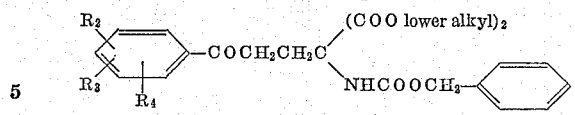

wherein R$_2$, R$_3$ and R$_4$ have the same meanings indicated above with hydrobromic acid in glacial acetic acid at room temperature.

References Cited by the Examiner

Tatsuoka et al.: "Chemical Abstracts," vol. 55, page 7434f (1961).

IRVING MARCUS, *Primary Examiner*.
JOHN D. RANDOLPH, *Examiner*.